United States Patent [19]

Morishita

[11] Patent Number: 5,015,814
[45] Date of Patent: May 14, 1991

[54] CORE REMOVING DEVICE FOR WIRECUT ELECTRICAL DISCHARGE MACHINING APPARATUS

[75] Inventor: Hiroaki Morishita, Aichi, Japan

[73] Assignee: Mitsubishi Denki Kabushiki Kaisha, Tokyo, Japan

[21] Appl. No.: 546,178

[22] Filed: Jun. 29, 1990

[30] Foreign Application Priority Data

Dec. 15, 1989 [JP] Japan ............... 1-324950

[51] Int. Cl.$^5$ ............... B23H 7/02; B23H 11/00
[52] U.S. Cl. ............... 219/69.12; 269/8; 269/21
[58] Field of Search ............... 269/8, 21; 219/69.11, 219/69.12; 408/68, 76; 83/651.1

[56] References Cited

U.S. PATENT DOCUMENTS

| | | | |
|---|---|---|---|
| 4,484,052 | 11/1984 | Inoue | 219/69.12 |
| 4,547,646 | 10/1985 | Briffod | 83/651.1 |
| 4,742,205 | 5/1988 | Vuichard | 219/69.12 |
| 4,745,253 | 5/1988 | Girardin | 219/69.12 |

FOREIGN PATENT DOCUMENTS

| | | | |
|---|---|---|---|
| 61-86132 | 5/1986 | Japan | 219/69.12 |
| 109617 | 5/1986 | Japan . | |
| 63-185531 | 8/1988 | Japan | 219/69.12 |
| 63-191515 | 8/1988 | Japan | 219/69.12 |

*Primary Examiner*—Geoffrey S. Evans
*Attorney, Agent, or Firm*—Sughrue, Mion, Zinn, Macpeak and Seas

[57] ABSTRACT

A core removing device for a wirecut electrical discharge machine having top and bottom universal movement tables that control the orientation of respective top and bottom guides, each guide being located generally within a nozzle which is surrounded by permanent magnet or an electromagnet. The guides and nozzles are disposed on opposite sides of a workpiece and guide a wire electrode that is used to perform an EDM operation as it travels along a cross section of the workpiece during machining. The relative orientation of the top and bottom guides will determine the angle at which the workpiece is cut and the shape of the remaining core. Upon completion of the machining operation, the core may be removed from the top surface or bottom surface of the workpiece by proper positioning of the guide nozzle and the controlled energization of the respective magnet, in the case of electromagnets, to attract and hold the core.

13 Claims, 5 Drawing Sheets

CORE REMOVING DEVICE FOR WIRECUT ELECTRICAL DISCHARGE MACHINING APPARATUS

BACKGROUND OF THE INVENTION

The present invention relates to a core removing device for a wirecut electrical discharge machine (EDM) which automatically removes cut-out cores and cut-off scraps that remain after the completion of the machining of a workpiece.

DESCRIPTION OF THE PRIOR ART

Figures 7A, 7B:
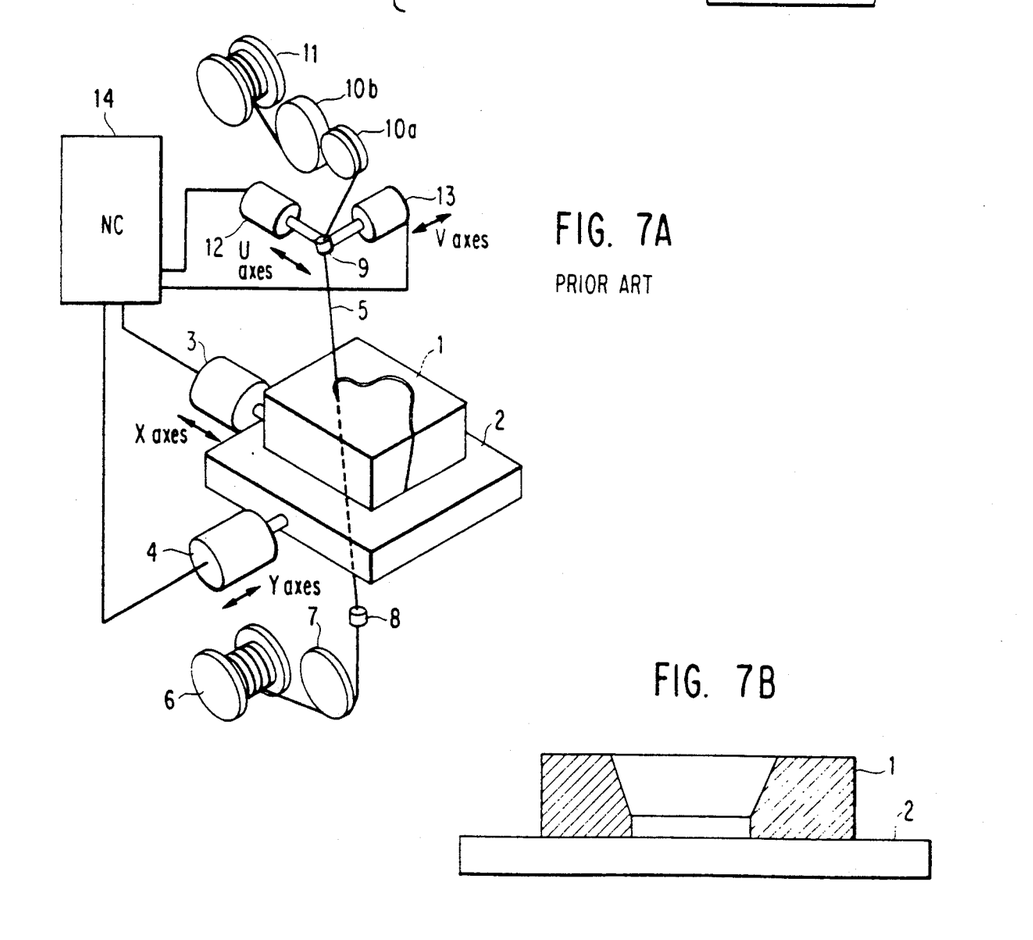
FIG. 7A shows a general wirecut EDM for machining a workpiece by tilting a wire electrode.
FIG. 7B is a detailed diagram showing a workpiece machined by the EDM shown in FIG. 7A.

Current wirecut EDM technology permits complicated profiles to be machined in a workpiece, as shown in Japanese Kokai No. 1987-47649. FIG. 7A is a configuration diagram illustrating a wirecut EDM for machining a tapered profile on a workpiece by tilting the wire electrode, as taught in that Kokai. Referring to FIG. 7A, a workpiece 1 is fitted to a table 2. The table 2 is driven and position-controlled by motors 3 and 4 in both the X and Y axis directions, respectively. A wire electrode 5 is supplied from a reel 6 via a roller 7 and a bottom guide holder 8 and wound around a take-up reel 11 after passing through a top guide holder 9 and rollers 10a and 10b. The top guide holder 9 is driven and position-controlled by motors 12 and 13 along U and V axes, respectively. A numerical control (NC) unit 14 is used for controlling the U- and V-axis drive motors 12, 13 and the X- and Y-axis drive motors 3, 4.

In ordinary straight machining, an NC tape for specifying a contour profile of a cutting edge is prepared and entered into the NC unit 14 for the wirecut EDM. In order to provide a taper on the cut surface of the workpiece, an NC tape is created by modifying the information which specifies the contour profile with additional parameters, such as information which specifies the contour profile of the cutting edge, the wire tilting angle, the distance between the top guide 9 and the workpiece bottom surface, the distance between the workpiece bottom surface and the bottom guide 8, etc. The NC data, when entered into the NC controller 14, will give a command to taper the workpiece 1 as shown in FIG. 7B.

During the wirecut EDM process described above, as the machining of the workpiece by cutting using the wire electrode approaches its conclusion, the cut core needs to be removed. Just before cutting is complete the core may move at an angle, or may lean by its own weight, causing the workpiece 1 and the wire electrode 5 to be shorted or causing the wire electrode to be nipped in the workpiece. To prevent such problems from occurring, the core must be held steady until cutting is complete, and on completion of cutting, the core must be extracted from the workpiece 1 and discarded, before the next machining operation is started. A removing device is therefore required to extract the core from the workpiece 1.

Figure 8:
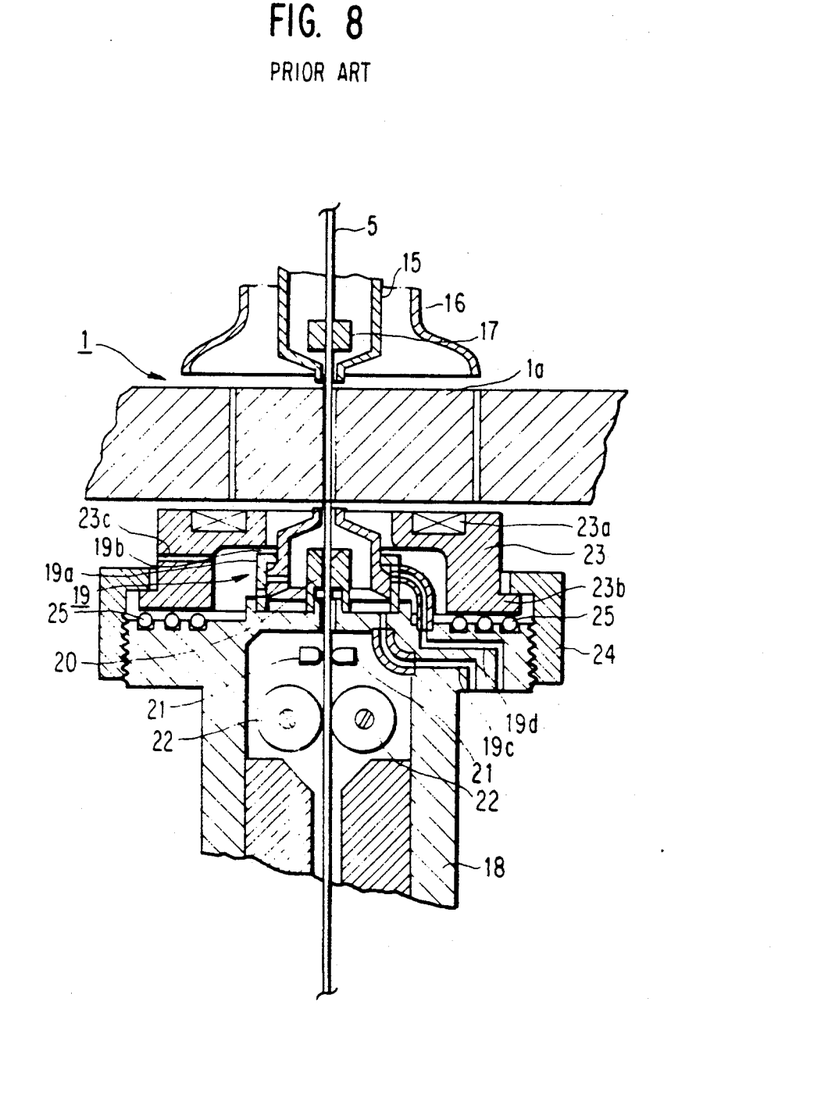
FIG. 8 is a sectional view of a prior art core removing device for wirecut EDM.
Figure 9:
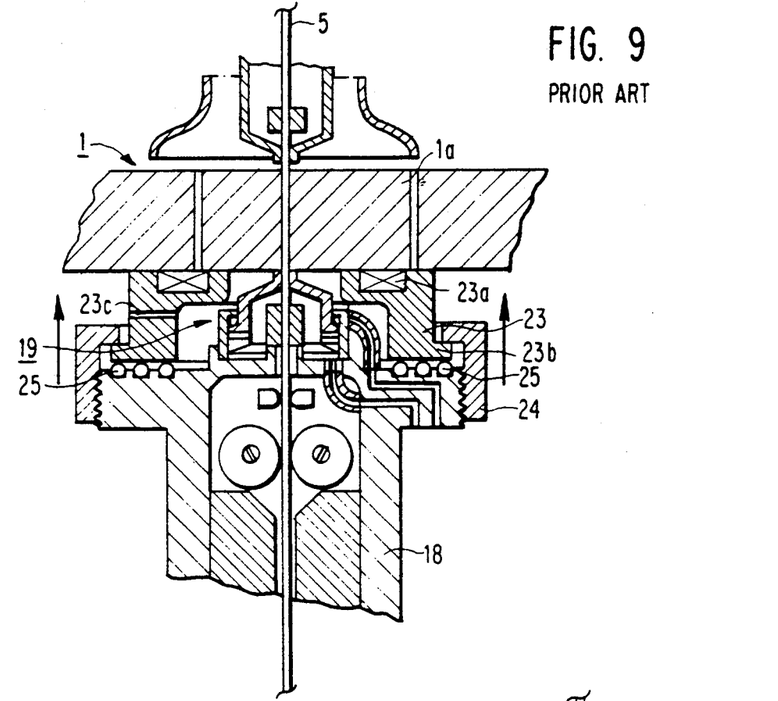
FIGS. 9 and 10 are illustrative diagrams showing a process of extracting a core by means of the device shown in FIG. 8.
Figure 10:
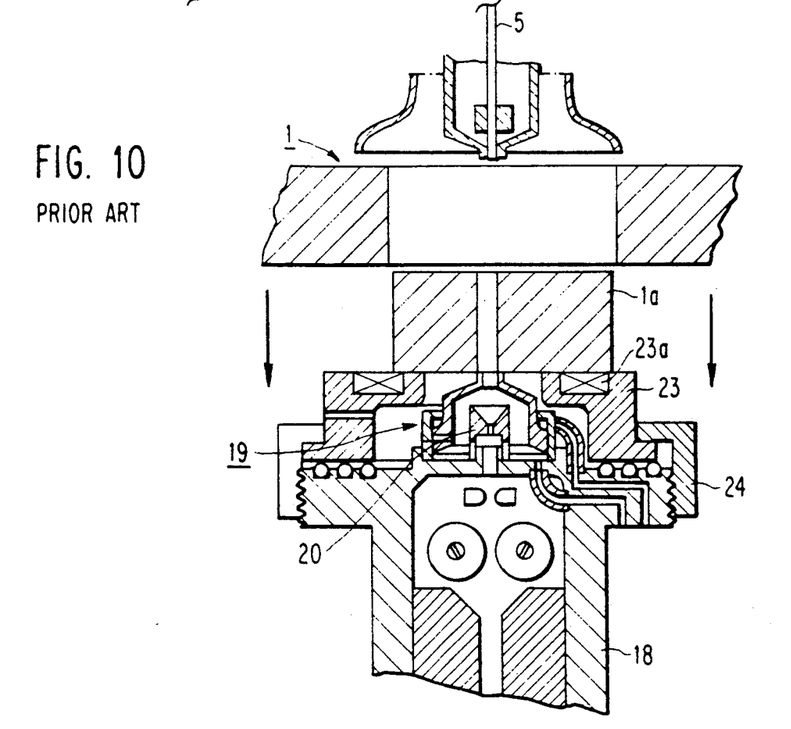

FIGS. 8 through 11 illustrate a type of core removing device for a wirecut EDM that is known in the prior art, and particularly taught in Kokai No. 1986-109617. FIG. 8 is a sectional view of the core remover for the wirecut EDM, and FIGS. 9 to 11 are illustrative diagrams showing a process of extracting a core using the core removing device. In the above drawings, a workpiece 1 is fixed to a machining table of the wirecut EDM with a clamp, or the like. The core 1a is to be cut by a wire electrode 5, and extracted from the workpiece 1. At an end of a top arm extending from a column (not illustrated) of the wirecut EDM onto the machining table is a top nozzle 15 which is sized and shaped to allow the wire electrode 5 to pass through the inside thereof and to permit a dielectric fluid to be injected toward a machining position at the point where the workpiece is being machined. An auxiliary nozzle 16, formed concentrically about nozzle 15, is sized and shaped to supply the dielectric to a limited area at the periphery of the machining position. An electrode guide die 17 is provided inside the top nozzle 15.

A bottom arm 18, that is oriented vertically and is movable on the column of the wirecut EDM, extends upwardly in the Figure toward the bottom of the workpiece 1. Alternatively, a movable bottom arm 18 may be provided vertically on a bed holding the machining table. A bottom nozzle 19 is installed at an end of the bottom arm 18 and is sized and shaped to allow the wire electrode 5 to pass through the inside thereof and to permit a dielectric fluid to be injected toward the machining position from the bottom of the workpiece. The bottom nozzle 19 is secured to arm 18 by a holder 19a that defines a fluid chamber and a float range for the nozzle. An electrode guide die 20 is provided concentrically about the wire electrode 5 on the inside of the bottom nozzle device 19. A pair of energizing pins 21 are disposed on opposite sides of and in contact with the wire electrode 5 for applying an EDMing voltage pulse to the wire electrode. A pair of take-off guide rollers 22 are disposed with the pins 21 inside of the arm 18. Surrounding the bottom nozzle 19 is an annular electromagnet 23 that is provided substantially coaxially to the bottom nozzle device 19. The electromagnet has a coil 23a, and is secured to the arm 18 by an electromagnet holder 24 that is threadedly fitted to a peripheral surface at the end of the bottom arm 18. Finally, ball bearings 25 displaceably support the electromagnet 23 within the holder 24.

Referring to FIGS. 7A and 8, the bottom arm 18 would encompass guide holder 8. Arm 18 may be controlled to move vertically in the figure (by a drive mechanism that is not illustrated) and to approach toward or separate from the workpiece 1, as necessary. During a machining process, the wire electrode 5 is supplied consecutively from the wire electrode supply reel 6 to the currently machined portion of the workpiece 1, via at least one guide roller 7 or a braking apparatus (not shown). In the machining area, the wire electrode 5 is stretched straight with constant tension between the top and bottom electrode guide dies 17 and 20 and forced to run, for example, from bottom to top in FIG. 7A. As voltage pulses are applied to the wire electrode, they discharge into the workpiece and result in a discharge erosion of the workpiece, whereby it is machined. The machined area is supplied with dielectric which is injected by the top nozzle 15, the auxiliary nozzle 16 and the bottom nozzle device 19. The bottom nozzle device 19 adopts a float nozzle as disclosed, for example, in Japanese Kokai No. 1984-063216. If the dielectric is introduced through a dielectric supply path 19c during an ordinary machining period, into the chamber defined by the holder 19a and containing the float nozzle 19b, the float nozzle is pushed upward to the highest position within the holder 19a. Alternatively, when the end of the wire electrode is automatically inserted into an EDMing starting hole of the workpiece, the float nozzle 19 may be pushed downward in the float chamber by introducing the dielectric through a dielectric supply path 19d. Even if the dielectric is not introduced through the dielectric supply path 19d, when an end of the float nozzle 19b closely approaches the workpiece surface, the nozzle 19b is pushed slightly downward by the reactionary pressure of the dielectric being injected against the workpiece by the nozzle end.

During the process of cutting into the workpiece 1 as described above, as the machining position approaches an end point of the machining path, the core 1a tends to lean or hang downward by its own weight from the supporting point of the workpiece portion left unmachined. This movement of the core may cause the machining to be stopped if a short is created between the wire electrode and the workpiece, or may result in a projection or a concave being produced at the area of the cutting end. To prevent these from occurring, the annular electromagnet 23, which surrounds the bottom nozzle device 19, attracts and holds the core 1a at a predetermined position so that smooth machining may be carried out near its end point. Once the machining is finished, the electromagnet can continue to attract the core 1a and facilitate its extraction from the workpiece. The extracted core can be discarded by an appropriate transfer means, (not illustrated), such as a robot hand.

The extraction of the core 1a will now be described specifically with reference to FIGS. 9 and 10, where like elements in FIG. 8 are identified by like numbers in these figures. As the machining position approaches the end point of the machining process, the core 1a is most likely to be displaced by its own weight. At such time, the bottom arm 18 is slowly moved upward from the position in FIG. 8 to that in FIG. 9, in accordance with a program preset in the numerical controller which controls machining feed. The upward movement progresses until the top surface of the electromagnet 23 abuts the bottom surfaces of the workpiece 1 and the core 1a as shown in FIG. 9. The workpiece 1 and the core 1a are then attracted to the electromagnet 23 when the coil 23a is energized, thereby fixing the position of the core relative to the workpiece. At this time, the dielectric injected by the bottom nozzle device 19 is drained through a hole 23c in a side wall of the electromagnet 23.

When the core 1a has been completely separated from the workpiece by completion of the machining as described above, the core 1a continues to be attracted to the electromagnet 23 and is extracted from the workpiece by moving the bottom arm 18 downward according to a command from the preprogrammed numerical controller, as seen in FIG. 10. Once the core 1a is withdrawn from the workpiece, the coil 23a of the electromagnet 23 may be deenergized and the core 1a removed from the electromagnet 23 and discarded by utilizing a robot hand or similar appropriate means. To enable the extracting and unloading function, the vertical movement range of the bottom arm 18 must be set to at least the maximum thickness of the workpiece 1.

Figures 3A, 3B, 3C, 3D, 4, 5:
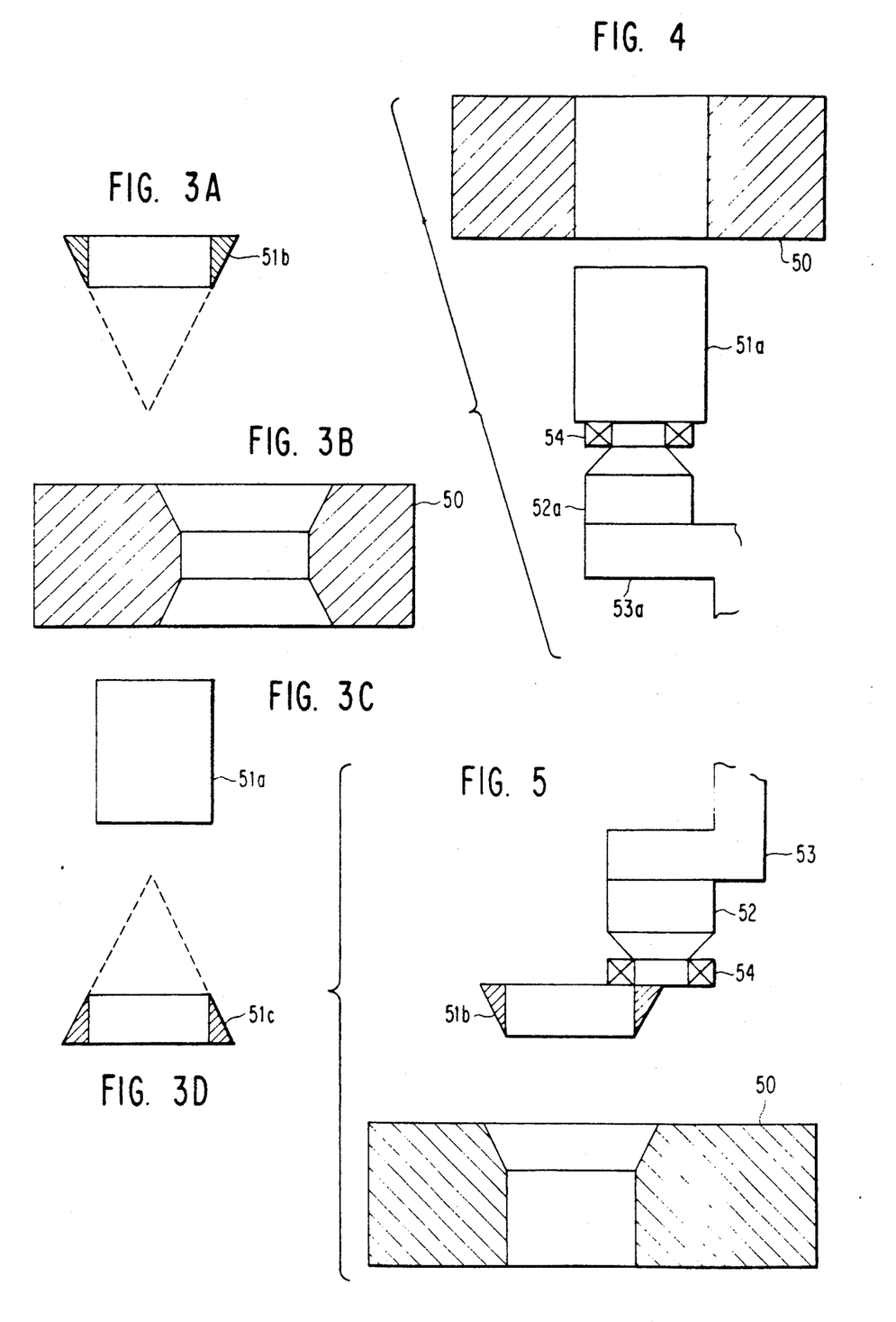
FIGS. 3A-3B are diagrams illustrating a machined profile.
FIGS. 4 to 6 are status diagrams showing core extracting operations performed by the core removing device illustrated in FIG. 1.

Since the prior art core removing device is designed to remove the core downwardly, a cone shaped core, such as that used for a draw die or an extruder die, (i.e., shaped like a drum 51b as shown in FIG. 3) cannot be extracted and ejected. Thus the prior art devices are limited by the machining profile of the workpiece.

If the workpiece is cut like a drum as shown in FIG. 3, and a process is used which comprises first ejecting the core 51a from the bottom of the workpiece, then turning the workpiece 180 degrees vertically, and ejecting the core 51b formed at the opposite surface (top surface), such a method is not practical. If the workpiece is, for example, a mold calling for particularly high machining accuracy, such method cannot provide the necessary high machining accuracy. Furthermore, if the core 1a is ejected by turning the workpiece 180 degrees in the vertical direction, as described above, the efficiency of the automatic machining operation is decreased.

SUMMARY OF THE INVENTION

Accordingly, it is an object of the present invention to overcome the disadvantages in the prior art by providing a core removing device for wirecut EDM which allows a core to be removed without any restrictions on machining profile in a totally automatic machining operation.

A core removing device for wirecut EDM relating to one embodiment of the present invention comprises a pair of attracting means provided opposite to each other across a workpiece for guiding a wire electrode at least either vertically or slantedly to a machined surface of the workpiece. The attracting means are located opposite to each other across the workpiece and adjacent to wire electrode passing guides for guiding the wire electrode. A driving means is used for moving the pair of guides relative to each other and with respect to the workpiece along the X, Y and Z axes. A setting means is used for setting the pair of guides to any angle relative to the workpiece.

Further, a core removing device for wirecut EDM relating to another embodiment of the present invention has attracting means which are located in each of a pair of nozzles and are provided coaxially to the wire electrode guides in the nozzles.

Further, a core removing device for wirecut EDM relating to another embodiment of the present invention has attracting means which are electromagnets provided coaxially to wire electrode passages in a pair of nozzles, and a controller for controlling the magnetism of the electromagnets.

According to the core removing device for wirecut EDM relating to one embodiment of the present invention, the core is attracted by the attracting means provided adjacent to the wire electrode passage hole in the nozzle and is removed from the workpiece by a driving means.

According to the core removing device for wirecut EDM relating to another embodiment of the present invention, the core is attracted by a permanent magnet provided in the nozzle and is withdrawn from the workpiece by movement of the driving means.

According to the core removing device relating to another embodiment of the present invention, the core is attracted by an electromagnet provided in the nozzle and is withdrawn from the workpiece, when attracted to the electromagnet, with the controller varying the magnetism level of the magnet in accordance with the weight of the workpiece.

DESCRIPTION OF THE PREFERRED EMBODIMENTS

Figure 1:
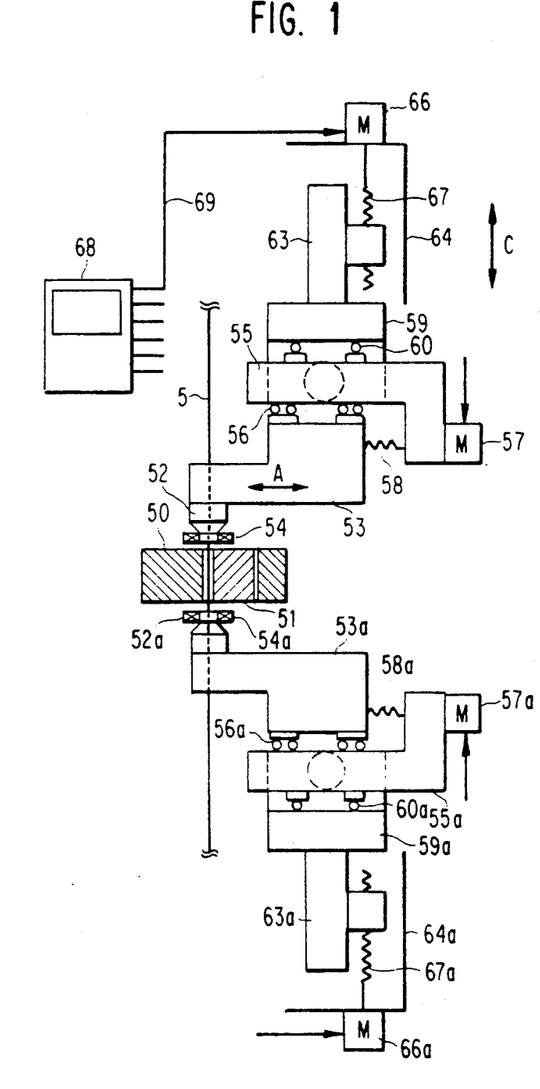
FIG. 1 is a front view of a core removing device for wirecut EDM in accordance with one embodiment of the present invention.
Figure 2:
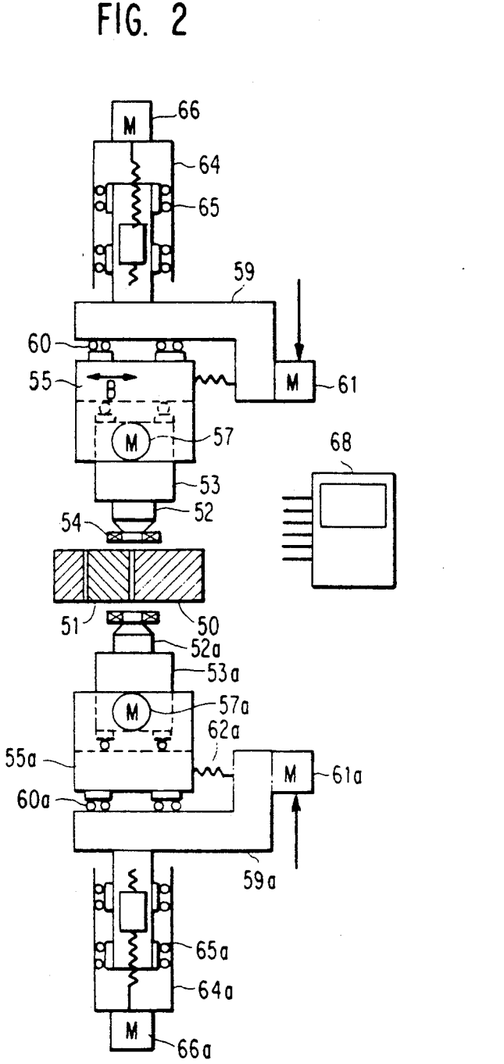
FIG. 2 is a side view of the core removing device illustrated in FIG. 1.

Preferred embodiments of the present invention will now be described. FIG. 1 is a front view of the configuration of the principal parts of a core removing device for wirecut EDM relating to the present invention, and FIG. 2 is a side view of the same. With reference to FIGS. 1 and 2, a workpiece 50 mounted on a machining table (not shown) of the wirecut EDM and secured by a clamp or the like, has a core volume 51 that is to be cut from the workpiece 50 by machining. A wire electrode 5 passes through top nozzle 52 and bottom nozzle 52a, located opposite to each other across the workpiece 50 and comprising ceramic materials or the like. The nozzles 52, 52a are retained, respectively, by a top arm 53 and a bottom arm 53a, extending from a column of the wirecut EDM onto the machining table. Through the top nozzle 52 and the bottom nozzle 52a, dielectric is injected toward a machining position on the workpiece 50. The structure in the interior of the nozzles may be similar to that in the prior art shown in, for example, FIG. 10. A gap exists between the top or bottom nozzles and the workpiece and is generally about 0.1 mm. Electromagnets 54 are provided concentrically around wire electrode passages in each of the top nozzle 52 and the bottom nozzle 52a and ordinarily are disposed opposite to each other across the workpiece 50. A conventional top cross table 55, and a bottom cross table 55a are disposed on opposite sides of the workpiece in the vertical direction. A bearing interface 56 is provided between the top cross table 55 and the top arm 53 for sliding the top arm 53 in a direction indicated by an arrow A in the figure. A bearing interface 56a is provided between the bottom cross table 55a and the bottom arm 53a for sliding the bottom arm 53a in a U-V plane in the direction indicated by the arrows A in FIG. 1. U-motors 57 and 57a are provided for the top cross table 55 and the bottom cross table 55a, respectively, and provide A-direction movement of arms 53, 53a in the U-V plane via ball screws 58, 58a, which transmit the rotational forces of the motors 57, 57a to the top arm 53 and the bottom arm 53a. A top cross table 59a and a bottom cross table 59a are interfaced to the top cross table 55 and the bottom cross table by bearing interfaces 60 and 60a, respectively, and permit the sliding of the top cross table 55 and the bottom cross table 55a in the V direction indicated by the arrow B in FIG. 2. Motors 61 and 61a are provided for the top cross table 59 and the bottom cross table 59a, respectively, and provide B-direction movement of arms 53, 53a in the U-V plane via ball screws 61, 61a.

Referring again to FIG. 1, a first quill 63 is installed on the top cross table 59 and a second quill 63a is installed on the bottom cross table 59a. There are two frames 64, 64a that are secured to the EDM (not shown) and provide a stable support for the machine in a work environment. Bearing interfaces 65, 65a are provided between the frames 64, 64a and the quills 63, 63a, respectively. A pair of Z-motors 66, 66a are provided for the quills 63, 63a, respectively, and are connected to ball screws 67, 67a for driving the quills. When driving the motors 66, 66a, ball screws 67, 67a cause the top cross table 59, the top cross table 55 and the top arm 53, as well as the bottom cross table 59a, the bottom cross table 55a and the bottom arm 53a to slide integrally in a direction indicated by arrows C in FIG. 1. The range of movement in the vertical direction is set to at least the maximum thickness of the workpiece 50 in each case.

The machining structure illustrated in FIGS. 1 and 2 is able to move the top nozzle 52 and the bottom nozzle 52a relative to each other and with respect to the workpiece 50 in the X, Y and Z directions. Both the top nozzle 52 and the bottom nozzle 52a may be moved to establish virtually any angle between the nozzle and the workpiece 50. For example, the angle defining the cone shaped core in FIG. 3A may be achieved by securing the bottom nozzle 52a and driving the top nozzle 52 with the U-motor 57 and the V-motor 61 so as to provide the desired angle between the top nozzle 52 and the bottom nozzle 52a across the workpiece 50. Inverse control of the top and bottom nozzles can achieve the cone shaped core in FIG. 3D.

A numerical controller controls a variety of machining operations, such as the machining pattern, required for EDMing of the workpiece 50, operation of magnets 54, 54a, extraction of the core 51, etc. and pre-stores programs necessary for such operations. The numerical controller 68 is connected to control the various motors by a signal cable 69. As seen in FIGS. 1 and 2, and as described above, the structures above and below the workpiece are substantially identical in configuration and are capable of performing the same operations across the workpiece 50.

The operation of the invention will now be described, with the exception of the EDMing operation itself whose details are not relevant to the present invention.

Referring first to FIGS. 3A-3D, extraction of the core from a workpiece 50, having a horizontal top and bottom surface, will be described by way of example. First, a straight portion having a cylindrical shape 51a is machined by EDMing. The top arm 53 and the bottom arm 53a are maneuvered to establish and maintain the wire electrode 5 at an orientation that is vertical to the top and bottom surfaces of workpiece 50. The wire electrode 5 and the workpiece 50 move relative to each other to carry out cutting. After machining of the straight portion is finished, the wire electrode 5 is cut by a wire cutter (not illustrated). In order to extract the core 51a, the bottom nozzle 52a is moved to a position at or near the center of gravity of the core 51a by a command signal from the numerical controller 68. Then, the magnet 54a on the bottom nozzle 52a is energized and the core 51a is attracted to and held to the nozzle by the magnet. Since the machining in this example is straight, after the core 51a has been attracted and held, the numerical controller 68 commands motor 66a to move the bottom nozzle 52a downward in the C-direction. The core 51a is thus removed from the workpiece 50. This operation is illustrated in FIG. 4.

In the second machining step, after core 51a has been removed, the wire electrode 5 is inserted into the top nozzle 52 and the bottom nozzle 52a by a wire insertion device (not shown). Then, V-motor 61, U-motor 57, V-motor 61a and U-motor 57a are controlled to cause the wire electrode 5 to tilt relative to the workpiece 50 and to define an inverse cone, i.e., a cone with its apex located at the bottom, as seen in FIG. 3A. The workpiece 50 is thus cut and core 51b is made. Since the machining pattern is that of an inverted cone as mentioned above, the numerical controller 68 then commands motor 66 to move the top nozzle 52 downward (and laterally if necessary) until its magnet 54 is over the core 51b. The magnet is then energized and the core 51b is attracted to the magnet 54 on the top nozzle 52. After the core 51b has been attracted, the numerical controller 68 commands motor 66 to move the top nozzle 52 upward. Once free of the workpiece, the core 51b can be discarded. The above operation is shown in FIG. 5.

Figure 6:
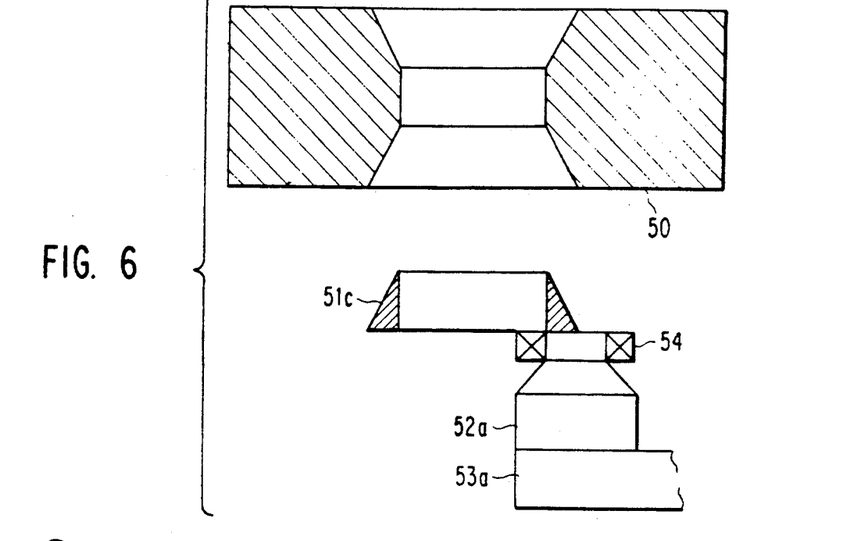

In the third machining step, after the core 51b has been removed and the wire electrode 54 again inserted into the top nozzle 52 and the bottom nozzle 52a, V-motor 61, U-motor 57, V-motor 61a and U-motor 57a are controlled to cause the wire electrode 5 to tilt relative to the workpiece 50 and define the shape of an ordinary cone, i.e., a cone with its apex located at the top. The workpiece 50 is thus cut and a core 51c is produced, as seen in FIG. 3D. Since the machining is that of an ordinary cone as previously described, the numerical controller 68 commands motor 66a to move the bottom nozzle 52a upward (and laterally if necessary) adjacent the core 51c. The magnet 54a is then engaged and the core 51c is attracted by the magnet 54 of the bottom nozzle 52a. After the core 51c has been attracted, the numerical controller 67 can command the motor 66a to move the bottom nozzle 52a downward. After core 51c has been removed from the workpiece 50, it can be discarded. The above operation is shown in FIG. 6.

After each of the cores 51a, 51b and 51c has been extracted from the workpiece 50 and while it still is attracted to one of the electromagnets 54, 54a, it may be moved to a predetermined position. At that position, the magnets 54, 54a may be deenergized to switch off the magnetic attraction. In this manner, the cores 51a, 51b, 51c are unloaded to a predetermined position and may be discarded by utilizing an appropriate means (not illustrated) such as a robot hand.

As would be understood by one of ordinary skill in the art, NC machines have achieved a high degree of sophistication and are operated by microprocessors under programmed control. Inputs to the microprocessor system may be by operator activation of a keyboard, by interactive graphics displays or automated measurement systems that determine any of a variety of workpiece parameters (such as size, weight and density) and can also monitor machine performance. Based upon calculations by the microprocessor using these input parameters, in a manner well understood by one of ordinary skill, the weight of the core sample can be calculated as well as its center of gravity, or determination can be made of the optimum contact point for a magnet to attach to a core. Alternatively, at least the the contact point information can be directly input by an operator. In a large volume manufacturing process where the work stock and the machining operations are the same for each work product produced, automation is of course more efficient. Where the attraction force is to vary in accordance with the weight of the core, a look up table may be utilized to control the degree of magnetization based upon the calculated or input weight of the core. Also, an attraction force profile may be used under processor control that gradually builds up the attraction of the core to the magnet, thus precluding too great of a force being applied to the core before the machining is completed, since the workpiece could be damaged if the core is removed too rapidly. These and other process considerations could be achieved well within the capabilities of one of ordinary skill in the art.

It will be appreciated that permanent magnets may be used as attracting means instead of the electromagnets in the preferred embodiment. A controller may be used to control the degree of energization of the coils of electromagnets for control of the magnetism thereof, so as to vary the attraction in accordance with the weight of the workpiece.

It will be appreciated that rare earth alloy permanent magnets, e.g., iron-chrome-cobalt alloy magnets and samarium-cobalt alloy magnets, may be employed as permanent magnets instead of commonly used alnico or ferrite magnets.

It will also be appreciated that suction may be utilized to attract the cores instead of the magnets employed in the preferred embodiments of the invention.

It will be apparent that the present invention, as described above, provides a core removing device for a wirecut EDM which allows a core to be removed with few restrictions on the profile to be machined and allows an automatic machining operation to be performed because a core is attracted by an attracting means provided adjacently to the wire electrode passage in the nozzle and also removed by driving means after being attracted to the attracting means. It will also be apparent that the present invention provides a core removing device for a wirecut EDM which ensures safe and economical operations because the attracting means is allowed to vary its attraction so that cores may be removed by varying the attraction in accordance with the weight of a body to be attracted, without substantial restrictions on the weight, and generates an attraction appropriate for the weight of the body to be attracted, under appropriate control.

What is claimed is:

1. A core removing device for an electric discharge machining apparatus using a wire electrode comprising:
   a pair of attracting means for supporting a core provided opposite one another across a workpiece;
   driving means for moving said pair of attracting means relatively to each other and with respect to each of X, Y and Z axes.

2. A core removing device as set forth in claim 1, wherein said attracting means comprises permanent magnets provided substantially coaxially to wire electrode guides arranged within said electric discharge machining apparatus, said guides being disposed within nozzle means, and said magnets surrounding ends of said nozzle means.

3. A core removing device as set forth in claim 1, wherein said attracting means comprises electromagnets provided substantially coaxially to wire electrode guides arranged within said electric discharge machining apparatus, said guides being disposed within nozzle means, said electromagnets surrounding ends of said nozzles, said attracting means further comprising a controller for controlling the magnetism of said electromagnets.

4. A waste portion removing device as set forth in claim 2, wherein each of said nozzle means provides dielectric fluid to said workpiece.

5. A waste portion removing device for a wirecut EDM having at least a first universally movable arm disposed on one side of a workpiece and a second universally movable arm disposed on the opposite side of the workpiece, said workpiece being machined with a wire electrode and creating said waste portion, said device comprising:
- a pair of guide means for guiding said wire electrode, each of said guide means being attached to a respective one of said first and second movable arms and being movable to orient said wire electrode at least either vertically or slantedly to at least one side of said workpiece;
- attracting means, disposed adjacent to each said guide means, for attracting said waste portion,
- driving means for moving said guide means relatively to each other in any of X, Y and Z directions, and
- setting means for setting said pair of guide means to substantially any angle relative to the workpiece.

6. A waste portion removing device as set forth in claim 5, wherein said attracting means comprises electromagnets provided coaxially to said wire electrode passing guides and a controller for controlling the magnetism of said electromagnets, said guide means being located generally within upper and lower nozzles, respectively, said electromagnets being generally disposed surrounding said nozzles.

7. A waste portion removing device as set forth in claim 5, wherein said attracting means comprises permanent magnets provided substantially coaxially to said wire electrode passing guides.

8. A waste portion removing device as set forth in claim 6, wherein said attracting means is provided adjacent to the wire electrode passing hole in the nozzle and said waste portion is ejected from the workpiece by said driving means.

9. A waste portion removing device as set forth in claim 5, wherein said core, when attracted by said attracting means, is withdrawn from the workpiece under control of said driving means.

10. A waste portion removing device as set forth in claim 7, wherein said attracting means is provided adjacent to the wire electrode passing hole in the nozzle and said waste portion is ejected from the workpiece by said driving means.

11. A waste portion removing device as set forth in claim 6, wherein the core is attracted by one of said electromagnets and is withdrawn from the workpiece, attached to the electromagnet, by the driving means.

12. A waste portion removing device as set forth in claim 5, wherein said attracting means uses a suction force.

13. A waste portion removing device as set forth in claim 5, wherein said attracting means comprises electromagnets, and means for varying the magnetic attraction of said electromagnets in accordance with the weight of the workpiece.

* * * * *